Oct. 1, 1963 M. M. SEELOFF 3,105,728
ROTARY CURRENT CONDUCTOR
Filed March 6, 1961
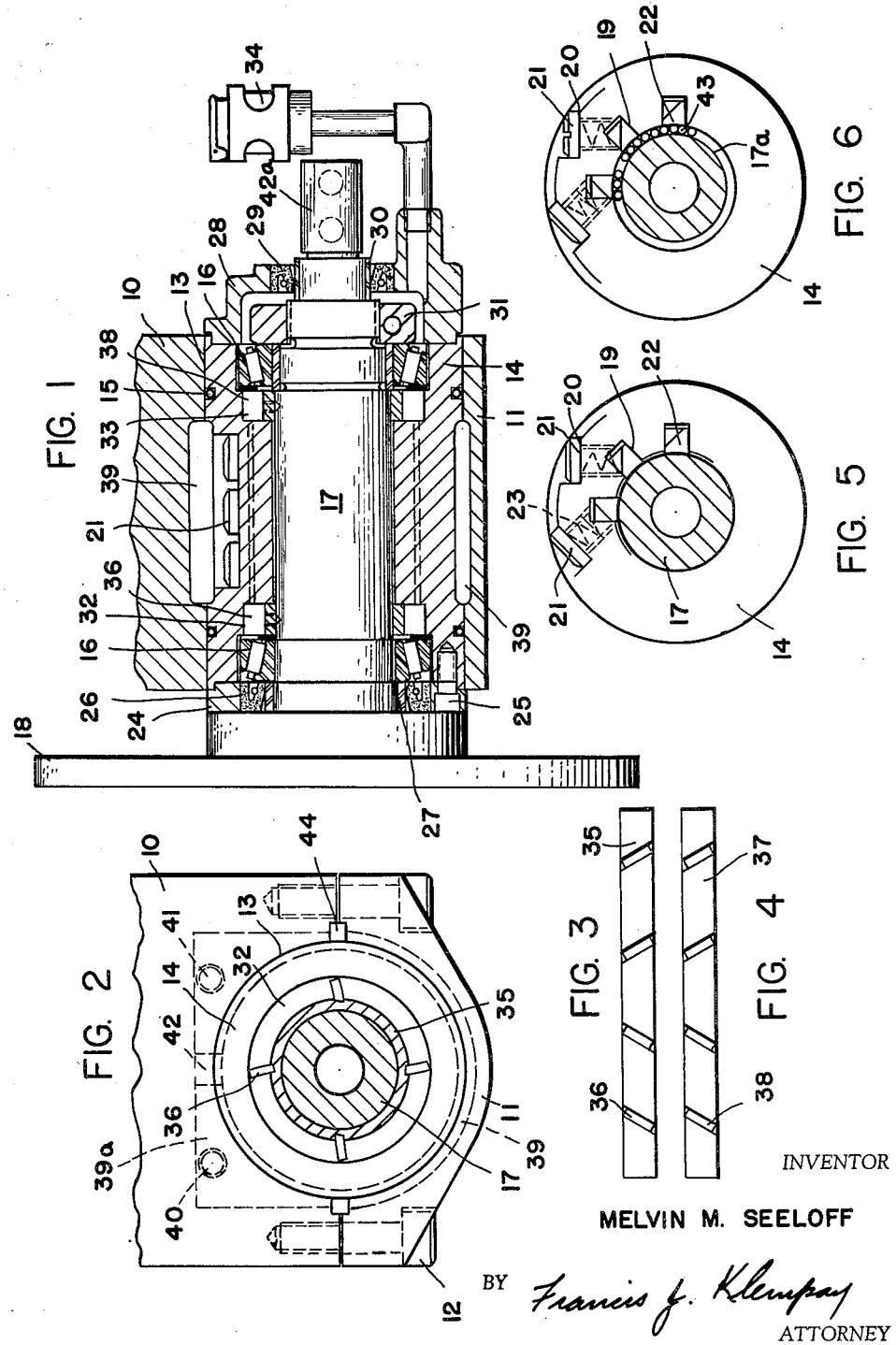
INVENTOR
MELVIN M. SEELOFF
BY Francis J. Klempay
ATTORNEY

United States Patent Office 3,105,728
Patented Oct. 1, 1963

3,105,728
ROTARY CURRENT CONDUCTOR
Melvin M. Seeloff, Warren, Ohio, assignor to The Taylor-Winfield Corporation, Warren, Ohio, a corporation of Ohio
Filed Mar. 6, 1961, Ser. No. 93,733
16 Claims. (Cl. 339—5)

The present invention relates to improved apparatus for transferring heavy electric current from stationary to rotating parts. Such apparatus has primary, but not exclusive, application in electric resistance seam welding apparatus where high current values are required and where substantial radial loads may be applied to the rotating part.

The primary object of the invention is the provision of apparatus for the purposes indicated above which is highly efficient in current-carrying capacity yet is small and compact and thus eminently suitable for use in machines such as seam welders where it is normally desired to maintain a relatively open welding throat. A more specific object of the invention is the provision of rotary current transferring or conducting apparatus in which the current is transferred through a multiplicity of elements arranged in parallel in the electrical circuit so that, first, very large current-carrying capacity is attained and, secondly, in the event of failure of any one of the elements the apparatus is not rendered inoperative but only less efficient. This feature is important in production plants in reducing shutdowns and work spoilage. The current transferring elements may be inspected and repaired or renewed, if necessary, during normal maintenance periods of the equipment.

A further object of the invention is the provision in apparatus of the kind described generally above of an arrangement whereby the critical current conducting or transferring elements may be made rather small and thus practical for fabrication from most efficient but expensive conductive materials such as silver. The construction is further advantageous in that the geometry of the elements is such that most effective use is made of the volume of conductive material employed as regards the areas of contact with the stationary and movable parts and as regards the length of the path of travel of the current through the material.

Another object of the invention is the provision of apparatus of the kind described above which is simple in design, economical to produce, and capable of being readily inspected, maintained, and installed in a composite machine such as a seam welder, for example. To this end the combined bearing and current transfer means is assembled in cartridge form for easy installation in a bore of a current-conductive part of the composite machine.

Yet another object of the invention is the provision in apparatus of the general kind outlined above of improved arrangements for retaining and circulating lubricating oil in the assembly for maximum bearing life and also for utilizing the efficient heat-transferring characteristic of the oil to aid in cooling the assembly. Also, the invention provides a simplified yet improved arrangement for retaining and circulating cooling water in and about the assembly so that heavy currents may be transmitted over long periods of time.

The above and other objects and advantages of the invention will become apparent upon consideration of the following specification and the accompanying drawing wherein there is illustrated two preferred embodiments of the invention.

In the drawing:
FIGURE 1 is a longitudinal section through a combined bearing and rotary current conductor constructed in accordance with the principles of my invention;

FIGURE 2 is a transverse sectional view of the apparatus of FIGURE 1;

FIGURES 3 and 4 are developed views of certain parts of the assembly of FIGURE 1;

FIGURE 5 is another transverse sectional view of the apparatus of FIGURE 1; and

FIGURE 6 is a sectional view similar to FIGURE 5 but of a modified form of the apparatus of FIGURE 1.

In the drawing, reference numeral 10 designates the lower end of a heavy current conductive member of a machine, such as a seam welder, and in actual practice this member 10 may be the copper terminal of a welding transformer. Secured to the lower end of member 10 is a cap 11 detachably held by cap screws 12 and, as shown, the assembled cap 11 and member 10 are formed with a thru-bore 13 which is provided to receive the cartridge assembly of this invention.

The apparatus of the invention is assembled in and on a unitary cylindrical member 14 formed of copper or other highly conductive material, and spaced inwardly from either end of the member 14 is a groove to receive a resilient O-ring 15 to form seals for a purpose to be later described. Received in recesses formed in either end of the body member 14 are insulated anti-friction bearings 16 which journal a spindle 17 passing through the body member 14. Spindle 17 is preferably formed of a copper alloy having good current-conductive and wearing qualities and of sufficient strength to withstand the radial loads imposed on it by the welding wheel or electrode 18 which is mounted on a projecting end of it.

In the embodiment of the invention shown in FIGURES 1 through 5 the bore through the center portion of the body member 14 is only slightly larger than the diameter of the contiguous center portion of the spindle 17 to allow the latter to rotate freely in the bore. Machined in the side wall of this bore is a plurality of circumferentially spaced but longitudinally extending slots 19 of which only three are shown in FIGURE 5 but of which in actual practice there is preferably more, equally spaced about the circumference of the bore.

On the outer surface of the body member 14 opposite the slots 19 there is machined a plurality of circumferentially spaced but longitudinally extending flats 20—one for each of the slots 19—and disposed at an angle of about 45 degrees to the side walls of the respective slots 19. Extending inwardly from each of the flats 20 in a direction toward the respective slots 19 are a plurality of tapped holes to receive the cap screws 21. Located within each of the slots 19 is a bar or "brush" 22, preferably made of silver and generally triangular in cross section. Thus, each of the bars 22 present one generally flat surface to the outer periphery of the center portion of the spindle 17, another flat surface in overlying relation to a flat side wall of the slot 19, and a third flat surface toward the cap screws 21. The shanks of the cap screws 21 are hollow to receive expansion coil springs 23 which engage the aforementioned flats on the bars 22. It should be noted particularly that by means of the construction recited each of the bars 22 is yieldably urged at longitudinally spaced points into flat overlying relation with both a side wall of the slot 19 and the outer periphery of the spindle 17. This is accomplished by means of a single row of springs at each bar, and it should be noted that the aggregate areas of contact between the bars 22 and the side walls of slots 19 and the rotatable spindle 21 are quite substantial so that heavy currents may be transferred without excessive density loading. The angular action of the springs 23 on the bars 22 insures that all of the interconnecting areas is pressure loaded to a predetermined desired extent to further assist in current transfer and to prevent deleterious arcing.

The cylinder 14 is closed off at its forward end by a ring 24 which is detachably secured to the cylinder 14 by cap screws 25 and which mounts within its inner periphery an oil sealing ring 26 having a rotating fit with a stainless steel ring 27 fixed on an enlarged portion of the spindle 17. The rear end of the cylindrical housing 14 is closed off by a cap 28 which is likewise detachably secured to the member 14 by cap screws, not shown, and which mounts an oil sealing ring 29 in which rotates a stainless steel ring 30 fixed on a smaller-diametered portion of the spindle 17. Housed within the cap 28 and threaded onto a portion of the spindle 17 is a bearing adjusting nut 31 which is of the locking type and which is operative to control the tightness of the anti-friction bearings 16 as will be understood.

For lubricating the anti-friction bearings 16 and the sliding contacts between the bars 22 and the spindle 17 I provide an annular recess 32 in the forward end of the body member 14 immediately inward of the recess which retains the adjacent bearing 16 while a similar recess 33 is formed in the body member 14 in corresponding position in the rear end thereof. It should be noted that the recesses 32 and 33 are interconnected by the slots 19 and since these slots are only partially filled by the bars 22 there are ample passages for the transfer of oil between recesses 32 and 33 and the center portions of bars 22. The rear cap 28 is formed with an inlet bore to which is connected an oil supply reservoir 34 positioned at a sufficient height that when the assembly is mounted in its normal horizontal position that all the oil passages and chambers in the assembly will be kept filled. It should be understood that the bearings 16 are of the unsealed type so that oil can flow freely through it in an axial direction from the space within cap 28. These bearings, however, are of the insulating type so that no current will flow through them from the housing 14 to the spindle 17.

To circulate the oil for maximum lubrication and cooling effects I provide an oil circulating ring in each of the recesses 32 and 33. The ring for recess 32 is shown more in detail in FIGURES 2 and 3 and comprises a mounting ring 35 which is rigidly secured to the spindle 17 by the pointed set screw shown in FIGURE 1. The outer periphery of ring 35 is transversely slotted at circumferentially spaced points to mount a plurality of neoprene fins 36 which have wiping contact with the outer cylindrical wall of the recess 32 as well as with the bottom wall of this recess. As shown in FIGURE 3 the fins 36 are angled with respect to their direction of movement, some to the left and some to the right as viewed in FIGURE 1, so that for one half of the circumference of the spindle 17 oil will be withdrawn from the passages provided by the slots 19 and forced to the left into the adjacent bearing 16 while in the other half circumferential portion of the spindle oil will be withdrawn from the bearing and forced to the right into the slots 19. A similar circulating ring comprised of a mounting ring 37 and fins 38 is mounted in the recess 33 and performs the same function of circulating the oil into and out of the adjacent bearing 16 and into and out of the slots 19. In addition, the fins 36 and 38 perform the further important function in wiping cool oil from the cylindrical surfaces of the recesses 32 and 33 to recirculate the same through the bearings and over the brushes or bars 22. Also, the mounting rings 35 and 37 serve the additional function of retaining the brushes or bars 22 in proper position within the slots 19.

To water-cool the assembly of the invention the bore in the parts 10, 11 is annularly grooved as shown at 39 to register with an annular groove formed in the outer wall of the body member 14 to thus provide a space or large passage for the flow of cooling water. This space or passage is sealed off by the O-rings 15. The recess 39 is enlarged in the terminal member 10 as shown at 39a to permit connection with an inlet port 40 and an outlet port 41. In the assembly of the apparatus a rubber or neoprene bar 42 is fixed in longitudinal relation in the center part of the enlargement 39a to form a barrier between the two halfs thereof. Thus, water under pressure coming in the inlet 40 will be forced to circulate downward and around the body member 14 through the passage formed in part by the recess 39 before being discharged through the outlet 41. Member 10 and cap 11 are suitably machined to receive and clamp rubber or neoprene bars 44 to complete the sealing of the water passage at assembly.

In accordance with conventional practice, the spindle 17 is hollow inwardly from its rear end, and rotatably mounted on the projecting rear end of the spindle is a fitting 42a carrying inlet and outlet ports. Also in accordance with conventional practice the fitting 42a may mount a small tube, not shown, connected with one of the ports and projecting into the center bore of the spindle 17 so that water may be carried to the closed end of the bore and then circulate back out through the other port on fitting 42a.

In the embodiment of the invention shown in FIGURE 6 the center portion of the spindle 17 between the rings 35 and 37 is made smaller in diameter as shown at 17a to provide an annular space for the reception of a plurality of anti-friction rollers or needles 43. While the drawing shows only a few such needles, it will be understood that in actual practice the entire annular space is filled with them. These needles are made of a material having good current-conductive and wearing qualities, preferably a silver alloy. In both embodiments of the invention the radial interface of each of the bars or brushes 22 is arcuately formed in concentricity with the outer wall of the spindle 17 in the case of FIGURE 5 and with the circle of the outermost portions of the needles 43 in the case of FIGURE 6. As shown in FIGURE 6, the diameter of the needles 43 is rather small in relation to the circumferential width of the bars 22 so that each of the bars press on a number of the needles at all times and the successive needles roll smoothly underneath of and away from the bars. Considering that in a practical embodiment some eight of the bars 22 may be used and that three needles may be under each bar the aggregate area of contact between the bars and the needles and between the needles and the spindle will be quite substantial and capable of carrying very heavy currents without excessive density or arcing. It should be noted particularly that since the bars 22 are of rather thin cross section and are each acted on by the springs 23 at a number of spaced points proper pressure contact will be maintained throughout the whole length of all of the needles which carry current.

It should now be apparent that I have provided an improved yet simplified apparatus for transferring heavy electrical currents from stationary to rotating parts. By reason of the fact that only a single spring or a single set of springs is required to hold the current transferring bars or brushes into both pressure contact with the stationary part and in pressure contact with the rotating part a large number of brushes or bars may be used in a small space. Further, the path of current travel through the brushes or bars is quite short, and the geometry of these elements permits the size and mass of them to be reduced to a minimum. All of this is accomplished by the angular action of the springs 23 and, of course, design considerations may indicate other angularity than the 45 degrees shown which is entirely possible in the arrangement of the parts. Also, in apparatus such as seam welders where the spindle 17 may be subjected to reverse rotation it may be desirable to form the end extremities of the bars or brushes 22 of square cross section so that these bars or brushes will have no tendency to overturn. Of course, these portions of square cross section would be outside the locations of contact between the bars or brushes and the spring 23.

Since in the preferred embodiments a large number of bars or brushes may be used and since these elements have some degree of flexibility the use of multiple springs on each element insures adequate pressure contact over the whole of the elements between the stationary part and the rotary part of the assembly. This makes for heavy current-carrying capacity and for dependability, as explained above.

Having thus described my invention what I claim is:

1. Apparatus for transmitting high amperage currents from an electrical terminal to a rotary current-conductive spindle comprising a removable cap for said terminal, a bore formed half in said terminal and half in said cap, a cylindrical housing of current-conductive material clamped in said bore by said cap, insulated anti-friction bearings received in the end portions of said housing and journaling said spindle, said housing having a plurality of circumferentially spaced but longitudinally extending slots in the wall of its bore intermediate said bearings, an elongated current-conductive bar positioned in each of said slots, and a plurality of resilient means retained within said housing and acting on each of said bars at longitudinally spaced points to urge each of said bars into contact with one side wall of its slot and also toward the axis of rotation of said spindle.

2. Apparatus according to claim 1 further including a plurality of elongated small-diametered conductive anti-friction rollers interposed between the outer periphery of said spindle and the bore within said housing, said rollers having their longitudinal axes parallel with the axis of rotation of the spindle and being radially inward of said bars, said rollers having pressure rolling contact with said outer periphery of the spindle and with said bars.

3. Apparatus according to claim 1 further characterized in that said cylindrical housing has an annular recess in its outer wall and intermediate its ends to provide a passage for the flow of a cooling fluid circumferentially around the housing.

4. Apparatus according to claim 1 further characterized in that said bore formed in said terminal and cap is formed with an annular recess intermediate its ends to provide a passage for the flow of a cooling fluid circumferentially around said housing.

5. Apparatus for transmitting high amperage currents from an electrical terminal to a rotary current-conductive spindle comprising a removable cap for said terminal, a bore formed half in said terminal and half in said cap, a cylindrical housing of current-conductive material clamped in said bore by said cap, insulated anti-friction bearings received in the end portions of said housing and journaling said spindle, axially elongated current-conductive members retained within said housing between said bearings and having means associated therewith to yieldably urge the same at axially spaced points into pressure contact with surfaces of the housing and toward said spindle, and means providing a passage circumferentially of said housing intermediate the ends thereof for the flow of a cooling fluid.

6. Apparatus according to claim 5 further characterized in that said housing is formed with annular recesses immediately inward of said bearings and with passageways interconnecting said recesses with said members, and oil-circulating impellers housed within said annular recesses and fixed on the spindle to circulate lubricating oil to said bearings and members.

7. Apparatus according to claim 6 further including a plurality of elongated small-diametered conductive anti-friction rollers interposed between the outer periphery of said spindle and the bore within said housing, said rollers having their longitudinal axes parallel with the axis of rotation of the spindle and being radially inward of said members, said rollers having pressure rolling contact with said outer periphery of the spindle and with said members.

8. Apparatus for transmitting high amperage currents to a rotary current-conductive spindle comprising a housing made of current-conductive material and having a thru-bore therein to receive said spindle, means at opposite ends of said bore to journal said spindle in said bore, said housing having a plurality of circumferentially spaced but longitudinally extending slots in the wall of said bore intermediate said journaling means, an elongated current-conductive bar positioned in each of said slots, and a plurality of resilient means retained within said housing and acting on each of said bars at longitudinally spaced points to urge each of said bars into contact with one side wall of its slot and also toward the axis of rotation of said spindle.

9. Apparatus according to claim 8 further including a plurality of elongated small-diametered conductive anti-friction rollers interposed between the outer periphery of said spindle and the bore within said housing, said rollers having their longitudinal axes parallel with the axis of rotation of the spindle and being radially inward of said bars, said rollers having pressure rolling contact with said outer periphery of the spindle and with said bars.

10. Apparatus according to claim 8 further characterized in that said bore is formed with an annular recess immediately inward of the journaling means at opposite ends thereof, said slots communicating with said recesses, and oil-circulating impellers housed within said annular recesses and fixed on the spindle to circulate lubricating oil to said journaling means and to said bars.

11. Apparatus according to claim 8 further characterized in that each of said bars is generally triangular in cross-section, said means to urge comprising coil springs retained within said housing and acting normal to the outer flats of said bars to thereby urge other flats of the bars into contact with side walls of said slots and yet other generally flat surfaces of said bars toward the axis of rotation of said spindle.

12. Apparatus for transmitting high amperage currents from a current-conductive housing to a current-conductive spindle journaled therein, said housing having axially extending recesses opening radially outward of said spindle and circumferentially spaced about said spindle, an elongated current-conductive brush in each of said recesses, and a plurality of resilient means retained in said housing and acting on said brushes at axially spaced points to urge each of said brushes both radially inward toward said spindle and circumferentially with respect to said spindle.

13. Apparatus according to claim 12 further including a plurality of elongated small-diametered conductive anti-friction rollers interposed between the outer periphery of said spindle and the bore within said housing, said rollers having their longitudinal axes parallel with the axis of rotation of the spindle and being radially inward of said brushes, said rollers having pressure rolling contact with said outer periphery of the spindle and with said brushes.

14. Apparatus for transmitting high amperage currents from a current-conductive housing to a current-conductive spindle journaled in the bore of the housing comprising longitudinally extending but circumferentially spaced slots in the side wall of the bore, a plurality of longitudinally spaced holes extending inwardly from the outer periphery of the housing into each of said slots and at an angle to the radial relation of the slots, a triangular shaped current-conductive bar in each of said slots, an expansion coil spring in each of said holes bearing on a flat of each of said bars, and means to restrain radially outward movement of the outer ends of said springs.

15. Apparatus for transmitting high amperage currents from a current-conductive housing to a current-conductive spindle journaled in a bore of the housing comprising an anti-friction bearing at each end of the bore to journal said spindle, an annular recess in said housing immediately inward of each of said bearings, current-conductive brushes spaced circumferentially about the spindle and received within recesses formed in the housing intermediate the first mentioned recesses, said brushes having current-carrying connections with said housing and spindle, passageways in said housing connecting said first and second mentioned recesses, and oil-circulating impellers within said first mentioned annular recesses and fixed on the spindle to circulate lubricating oil to said bearings and said second mentioned recesses.

16. Apparatus according to claim 15 further characterized in that said impellers comprise yieldable radially projecting fins operative to engage and wipe oil from the cylindrical surfaces of said first mentioned annular recesses.

References Cited in the file of this patent
UNITED STATES PATENTS

| | | |
|---|---|---|
| 2,256,118 | Kyropoulos | Sept. 16, 1941 |
| 2,274,514 | Willsey | Feb. 24, 1942 |
| 2,474,601 | Thomas | June 28, 1949 |
| 2,529,634 | Sciaky | Nov. 14, 1950 |
| 2,726,371 | Seeloff | Dec. 6, 1955 |
| 2,879,490 | Campbell et al. | Mar. 24, 1959 |